(12) United States Patent
Wu et al.

(10) Patent No.: US 10,972,971 B2
(45) Date of Patent: *Apr. 6, 2021

(54) ACCESS POINT HANDOVER METHOD IN WIRELESS COMMUNICATIONS, NETWORK CONTROL NODE, AND USER EQUIPMENT

(71) Applicant: Huawei Technologies Co., Ltd., Shenzhen (CN)

(72) Inventors: Hao Wu, Shenzhen (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,653

(22) Filed: Jun. 18, 2019

(65) Prior Publication Data

US 2019/0306789 A1 Oct. 3, 2019

Related U.S. Application Data

(63) Continuation of application No. 15/481,761, filed on Apr. 7, 2017, now Pat. No. 10,362,534, which is a (Continued)

(30) Foreign Application Priority Data

Oct. 10, 2014 (CN) .......................... 201410531123.8

(51) Int. Cl.
*H04L 12/28* (2006.01)
*H04W 48/20* (2009.01)
(Continued)

(52) U.S. Cl.
CPC ........ *H04W 48/20* (2013.01); *H04Q 11/0478* (2013.01); *H04W 8/24* (2013.01);
(Continued)

(58) Field of Classification Search
None
See application file for complete search history.

(56) References Cited

U.S. PATENT DOCUMENTS

| | | | |
|---|---|---|---|
| 8,565,793 B1 | 10/2013 | Koodli | |
| 10,362,534 B2 * | 7/2019 | Wu | .......................... H04W 8/24 |

(Continued)

FOREIGN PATENT DOCUMENTS

| | | |
|---|---|---|
| CN | 101841880 A | 9/2010 |
| CN | 102149153 A | 8/2011 |

(Continued)

OTHER PUBLICATIONS

Peng et al, CN-105472767-B, Published Apr. 6, 2016, pp. 1-14 (English Machine Translation).*

(Continued)

*Primary Examiner* — Phuongchau Ba Nguyen
(74) *Attorney, Agent, or Firm* — Conley Rose, P.C.

(57) ABSTRACT

An access point (AP) handover method in wireless communications, a network control node, and user equipment includes obtaining AP information of a target AP having an association relationship with the target base station when user equipment is handed over to a target base station; and sending a first indication message to the user equipment, where the first indication message includes the AP information, and the first indication message is used to instruct the user equipment to perform AP handover according to the AP information.

20 Claims, 6 Drawing Sheets

200

When user equipment is handed over to a target base station, obtain access point AP information of a target AP having an association relationship with the target base station — S210

Send a first indication message to the user equipment, where the first indication message includes the AP information, and the first indication message is used to instruct the user equipment to perform AP handover according to the AP information — S220

Related U.S. Application Data continuation of application No. PCT/CN2015/089819, filed on Sep. 17, 2015.

(51) Int. Cl.
<table>
<tr><td>H04W 76/10</td><td>(2018.01)</td></tr>
<tr><td>H04W 36/14</td><td>(2009.01)</td></tr>
<tr><td>H04W 36/36</td><td>(2009.01)</td></tr>
<tr><td>H04W 36/38</td><td>(2009.01)</td></tr>
<tr><td>H04W 36/00</td><td>(2009.01)</td></tr>
<tr><td>H04Q 11/04</td><td>(2006.01)</td></tr>
<tr><td>H04W 8/24</td><td>(2009.01)</td></tr>
<tr><td>H04W 36/08</td><td>(2009.01)</td></tr>
<tr><td>H04W 36/34</td><td>(2009.01)</td></tr>
<tr><td>H04W 48/16</td><td>(2009.01)</td></tr>
<tr><td>H04W 48/00</td><td>(2009.01)</td></tr>
<tr><td>H04W 48/18</td><td>(2009.01)</td></tr>
<tr><td>H04W 76/16</td><td>(2018.01)</td></tr>
</table>

(52) U.S. Cl.
CPC ....... *H04W 36/0061* (2013.01); *H04W 36/08* (2013.01); *H04W 36/14* (2013.01); *H04W 36/34* (2013.01); *H04W 36/36* (2013.01); *H04W 36/385* (2013.01); *H04W 48/16* (2013.01); *H04W 48/17* (2013.01); *H04W 48/18* (2013.01); *H04W 76/10* (2018.02); *H04W 76/16* (2018.02)

(56) References Cited

U.S. PATENT DOCUMENTS

<table>
<tr><td>2009/0207766 A1</td><td>8/2009</td><td>Hwang et al.</td></tr>
<tr><td>2012/0108240 A1</td><td>5/2012</td><td>Liu et al.</td></tr>
<tr><td>2013/0130700 A1</td><td>5/2013</td><td>Aoyagi et al.</td></tr>
<tr><td>2015/0201334 A1</td><td>7/2015</td><td>Li et al.</td></tr>
</table>

FOREIGN PATENT DOCUMENTS

<table>
<tr><td>CN</td><td>103024867 A</td><td></td><td>4/2013</td><td></td></tr>
<tr><td>CN</td><td>103037476 A</td><td></td><td>4/2013</td><td></td></tr>
<tr><td>CN</td><td>105472767 B</td><td>*</td><td>3/2019</td><td>............ H04W 24/04</td></tr>
<tr><td>WO</td><td>2014047890 A1</td><td></td><td>4/2014</td><td></td></tr>
<tr><td>WO</td><td>2014161497 A1</td><td></td><td>10/2014</td><td></td></tr>
</table>

OTHER PUBLICATIONS

"3rd Generation Partnership Project; Technical Specification Group Core Network and Terminals; Numbering Addressing and Identification (Release 12)," 3GPP TS 23.003, V124.0, Sep. 2014, 90 pages.

* cited by examiner

200

```
┌─────────────────────────────────────────┐
│ When user equipment is handed over to a │
│ target base station, obtain access point│
│ AP information of a target AP having an │──S210
│ association relationship with the       │
│ target base station                     │
└─────────────────────────────────────────┘
                    │
┌─────────────────────────────────────────┐
│ Determine a base station type of the    │──S230
│ target base station                     │
└─────────────────────────────────────────┘
                    │
┌─────────────────────────────────────────┐
│ When it is determined that the base     │
│ station type of the target base station │
│ is a micro base station, send a first   │──S221
│ indication message including the AP     │
│ information to the user equipment       │
└─────────────────────────────────────────┘
```

FIG. 3

ACCESS POINT HANDOVER METHOD IN WIRELESS COMMUNICATIONS, NETWORK CONTROL NODE, AND USER EQUIPMENT

CROSS-REFERENCE TO RELATED APPLICATION

This application is a continuation application of U.S. patent application Ser. No. 15/481,761, filed on Apr. 7, 2017, which is a continuation application of International Application No. PCT/CN2015/089819, filed on Sep. 17, 2015, which claims priority to Chinese Patent Application No. 201410531123.8, filed on Oct. 10, 2014. All of the aforementioned patent applications are hereby incorporated by reference in their entireties.

TECHNICAL FIELD

The present disclosure relates to the field of wireless communications, and in particular, to an access point handover method in wireless communications, a network control node, and user equipment.

BACKGROUND

A current trend is integration (collocation site) between a cellular base station and a WiFi wireless access point (AP). On one hand, the AP can share various resources (power supply, a backhaul network, and the like) of the base station; on the other hand, the AP can offload data traffic from the base station. The cellular base station is integrated with the AP, that is, the cellular base station and the AP form an association relationship. This association relationship may be that one base station corresponds to one AP, or may be that one base station corresponds to multiple APs.

A current AP handover method is when a client sends, to a background server, base station information of a cell to which the client belongs, and the background server recommends, to the client according to the received base station information, an AP to which user equipment can be handed over; or when user equipment finds that a currently connected AP is unavailable, the user equipment searches to find a new connectable AP. Consequently, according to these methods, corresponding AP handover cannot be performed in a timely manner after user equipment is handed over to a target base station, or because an AP to which user equipment is handed over does not have an association relationship with a base station, the AP to which the user equipment is handed over is invalid.

SUMMARY

The present disclosure provides an access point handover method in wireless communications, a network control node, and user equipment such that the user equipment can be handed over to a valid AP in a more timely and accurate manner.

According to a first aspect, an access point handover method in wireless communications is provided, where the method includes, when user equipment is handed over to a target base station, obtaining access point AP information of a target AP having an association relationship with the target base station; and sending a first indication message to the user equipment, where the first indication message includes the AP information, and the first indication message is used to instruct the user equipment to perform AP handover according to the AP information.

With reference to the first aspect, in a first possible implementation manner of the first aspect, the method further includes determining a base station type of the target base station; and the sending a first indication message to the user equipment includes, when the base station type of the target base station is a micro base station, sending the first indication message to the user equipment.

With reference to the first aspect or the first possible implementation manner of the first aspect, in a second possible implementation manner of the first aspect, the sending a first indication message to the user equipment includes sending the first indication message to the user equipment using the target base station.

With reference to the first aspect or the first possible implementation manner of the first aspect, in a third possible implementation manner of the first aspect, the sending a first indication message to the user equipment includes, when the user equipment maintains a communication connection to an AP from which the user equipment is handed over, sending the first indication message to the user equipment using the AP from which the user equipment is handed over.

With reference to any one of the first aspect, or the first to the third possible implementation manners of the first aspect, in a fourth possible implementation manner of the first aspect, the method further includes sending a second indication message to the AP from which the user equipment is handed over, where the second indication message is used to instruct the AP, from which the user equipment is handed over, to send a communication key between the AP from which the user equipment is handed over and the user equipment to the target AP such that the target AP establishes a communication connection to the user equipment according to the communication key.

With reference to any one of the first aspect, or the first to the fourth possible implementation manners of the first aspect, in a fifth possible implementation manner of the first aspect, the AP information includes at least one of a media access control (MAC) address of the target AP or identification information of the target AP.

With reference to any one of the first aspect, or the first to the fifth possible implementation manners of the first aspect, in a sixth possible implementation manner of the first aspect, the target AP having an association relationship with the target base station includes the target AP integrated with the target base station.

According to a second aspect, an access point handover method in wireless communications is provided, where the method includes, after being handed over to a target base station, receiving a first indication message sent by a network control node, where the first indication message is used to instruct user equipment to perform AP handover, and the first indication message includes AP information of a target AP having an association relationship with the target base station; and performing AP handover according to the first indication message.

With reference to the second aspect, in a first possible implementation manner of the second aspect, the receiving a first indication message sent by a network control node includes receiving the first indication message that is sent by the network control node when a base station type of the target base station is a micro base station.

With reference to the second aspect or the first possible implementation manner of the second aspect, in a second possible implementation manner of the second aspect, the receiving a first indication message sent by a network control node includes receiving the first indication message sent by the network control node using the target base station.

With reference to the second aspect or the first possible implementation manner of the second aspect, in a third possible implementation manner of the second aspect, the receiving a first indication message sent by a network control node includes, when maintaining a communication connection to an AP from which the user equipment is handed over, receiving the first indication message sent by the network control node using the AP from which the user equipment is handed over.

With reference to any one of the second aspect, or the first to the third possible implementation manners of the second aspect, in a fourth possible implementation manner of the second aspect, the AP information includes at least one of a media access control MAC address of the target AP or identification information of the target AP.

With reference to any one of the second aspect, or the first to the fourth possible implementation manners of the second aspect, in a fifth possible implementation manner of the second aspect, the target AP having an association relationship with the target base station includes the target AP integrated with the target base station.

According to a third aspect, a network control node in a wireless communications network is provided, where the network control node includes an obtaining module configured to, when user equipment is handed over to a target base station, obtain access point AP information of a target AP having an association relationship with the target base station; and a first sending module configured to send a first indication message to the user equipment, where the first indication message includes the AP information obtained by the obtaining module, and the first indication message is used to instruct the user equipment to perform AP handover according to the AP information.

With reference to the third aspect, in a first possible implementation manner of the third aspect, the network control node further includes a determining module configured to determine a base station type of the target base station; and the first sending module is further configured to, when the determining module determines that the base station type of the target base station is a micro base station, send the first indication message to the user equipment.

With reference to the third aspect or the first possible implementation manner of the third aspect, in a second possible implementation manner of the third aspect, the first sending module is further configured to send the first indication message to the user equipment using the target base station.

With reference to the third aspect or the first possible implementation manner of the third aspect, in a third possible implementation manner of the third aspect, the first sending module is further configured to, when the user equipment maintains a communication connection to an AP from which the user equipment is handed over, send the first indication message to the user equipment using the AP from which the user equipment is handed over.

With reference to any one of the third aspect or the first to the third possible implementation manners of the third aspect, in a fourth possible implementation manner of the third aspect, the network control node further includes a second sending module configured to send a second indication message to the AP from which the user equipment is handed over, where the second indication message is used to instruct the AP, from which the user equipment is handed over, to send a communication key between the AP from which the user equipment is handed over and the user equipment to the target AP such that the target AP establishes a communication connection to the user equipment according to the communication key.

With reference to any one of the third aspect, or the first to the fourth possible implementation manners of the third aspect, in a fifth possible implementation manner of the third aspect, the AP information obtained by the obtaining module includes at least one of a media access control MAC address of the target AP or identification information of the target AP.

With reference to any one of the third aspect, or the first to the fifth possible implementation manners of the third aspect, in a sixth possible implementation manner of the third aspect, the target AP having an association relationship with the target base station includes the target AP integrated with the target base station.

According to a fourth aspect, user equipment is provided, where the user equipment includes a receiving module configured to, after the user equipment is handed over to a target base station, receive a first indication message sent by a network control node, where the first indication message is used to instruct the user equipment to perform AP handover, and the first indication message includes AP information of a target AP having an association relationship with the target base station; and a handover module configured to perform AP handover according to the first indication message received by the receiving module.

With reference to the fourth aspect, in a first possible implementation manner of the fourth aspect, the receiving module is further configured to receive the first indication message that is sent by the network control node when a base station type of the target base station is a micro base station.

With reference to the fourth aspect or the first possible implementation manner of the fourth aspect, in a second possible implementation manner of the fourth aspect, the receiving module is further configured to receive the first indication message sent by the network control node using the target base station.

With reference to the fourth aspect or the first possible implementation manner of the fourth aspect, in a third possible implementation manner of the fourth aspect, the receiving module is further configured to, when the user equipment maintains a communication connection to an AP from which the user equipment is handed over, receive the first indication message sent by the network control node using the AP from which the user equipment is handed over.

With reference to any one of the fourth aspect, or the first to the third possible implementation manners of the fourth aspect, in a fourth possible implementation manner of the fourth aspect, the AP information received by the receiving module includes at least one of a media access control MAC address of the target AP or identification information of the target AP.

With reference to any one of the fourth aspect, or the first to the fourth possible implementation manners of the fourth aspect, in a fifth possible implementation manner of the fourth aspect, the target AP having an association relationship with the target base station includes the target AP integrated with the target base station.

Based on the foregoing technical solutions, according to the access point handover method in wireless communications, the network control node, and the user equipment that are in embodiments of the present disclosure, after the user equipment is handed over to a target base station, according to an association relationship between the target base station and an AP, a network control device instructs the user equipment to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

BRIEF DESCRIPTION OF THE DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 3 is a schematic flowchart of an access point handover method in wireless communications according to an embodiment of the present disclosure;

DETAILED DESCRIPTION

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
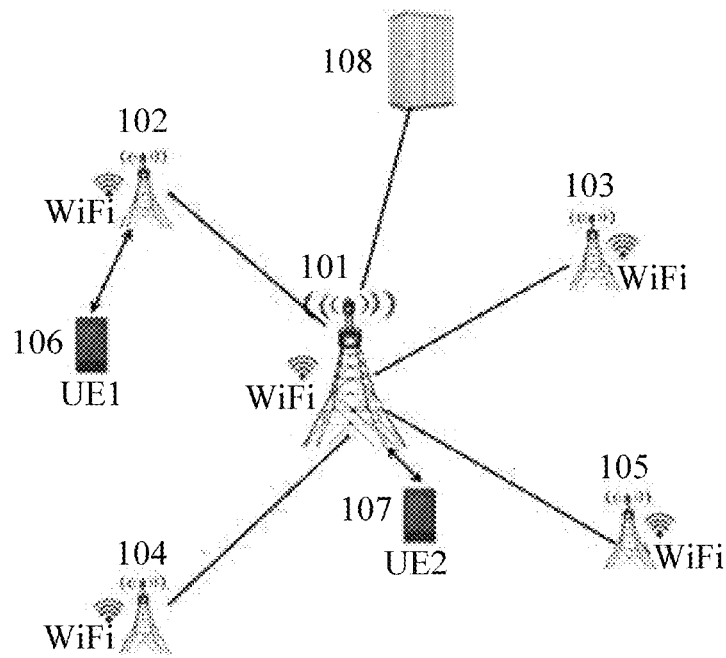
FIG. 1 is a schematic architecture diagram of an application scenario according to an embodiment of the present disclosure.

FIG. 1 illustrates a schematic architecture diagram of an application scenario according to an embodiment of the present disclosure. In this embodiment of the present disclosure, cellular base stations may be classified into a macro base station and a micro base station. The macro base station has a wide coverage area, allows a large quantity of users to access, and provides user bandwidth with a specific limitation, while the micro base station has a much smaller coverage area and provides high-speed services with large bandwidth for a user.

Further, in FIG. 1, 101 represents a macro base station, and the macro base station integrates an AP. 102, 103, 104, and 105 all represent micro base stations controlled by the macro base station 101, and these micro base stations each also integrate an AP. 106 represents user equipment 1 (UE1), which is connected to the micro base station 102 and the AP integrated with the micro base station. 107 represents user equipment 2 (UE2), which is connected to the macro base station 101 and the AP integrated with the macro base station. 108 represents a network control node, and the network control node is configured to control handover of user equipment between different base stations, for example, may control the user equipment 106 to be handed over from the currently connected micro base station 102 to the micro base station 103.

The network control node may have different product forms in different networks, and may be a radio network controller (RNC), or may be a mobility management entity (MME), or even may be a module integrated and deployed in a base station.

Figure 2:
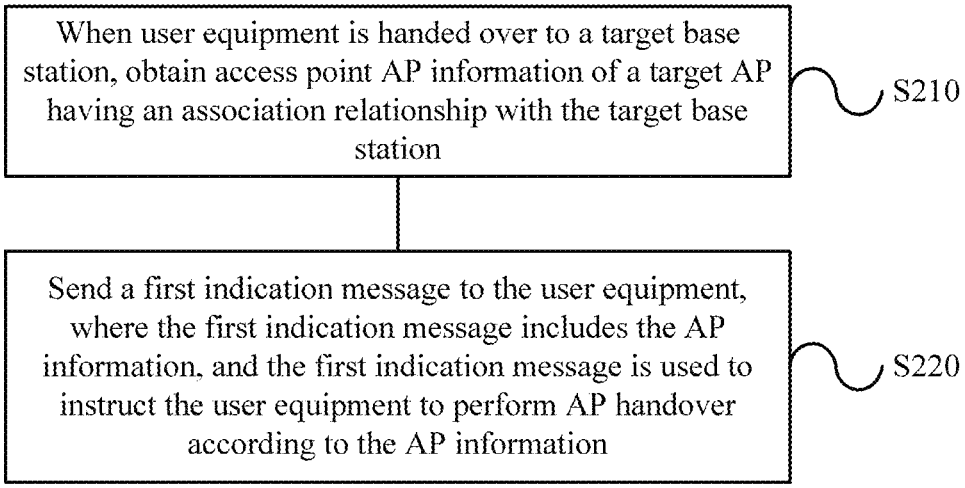
FIG. 2 is a schematic flowchart of an access point handover method in wireless communications according to an embodiment of the present disclosure.

FIG. 2 illustrates a schematic flowchart of an access point handover method 200 in wireless communications according to an embodiment of the present disclosure. The method 200 may be performed by a network control node. As shown in FIG. 2, the method 200 includes the following steps.

S210: When user equipment is handed over to a target base station, obtain AP information of a target AP having an association relationship with the target base station.

S220: Send a first indication message to the user equipment, where the first indication message includes the AP information, and the first indication message is used to instruct the user equipment to perform AP handover according to the AP information.

Further, due to location movement or another reason, the user equipment is handed over from an original base station to the target base station. After determining that the user equipment is handed over to the target base station, the network control node may determine the target AP having an association relationship with the target base station, and may further obtain the AP information of the target AP. The network control node may send the first indication message including the AP information to the user equipment. The first indication message may be used to instruct the user equipment to perform AP handover.

Therefore, according to the access point handover method in wireless communications in this embodiment of the present disclosure, after user equipment is handed over to a target base station, according to an association relationship between the target base station and an AP, a network control node instructs the user equipment to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

In step S210, when determining that the user equipment is handed over to the target base station, the network control node obtains the AP information of the target AP having an association relationship with the target base station. In this embodiment of the present disclosure, due to location movement or another reason, the user equipment is handed over from an original base station to the target base station, and a handover process may follow a signaling process specified in an existing 3rd Generation Partnership Project (3GPP) standard. After completing the handover to the target base station, the user equipment may send an acknowledgement message to the network control node. The network control node determines, using the acknowledgement message, that the user equipment has been handed over to the target base station, or detects, using another method, the user equipment is handed over to the target base station. The present disclosure is not limited thereto.

In this embodiment of the present disclosure, after determining that the user equipment completes base station handover, the network control node may obtain, by querying an association relationship between a target base station to which the user equipment is handed over and an AP, the AP information of the target AP having an association relationship with the target base station. This association relationship may refer to integration between a base station and an AP such that the AP can share various resources (power supply, a backhaul network, and the like) of the base station, and can further offload data traffic from the base station. The network control node determines the AP information according to the target AP.

In this embodiment of the present disclosure, the AP information is used to indicate the target AP, the AP information has a correspondence with the target AP, and the corresponding target AP may be determined according to the AP information. Further, the AP information may include at least one of a MAC address or identification information of the target AP.

In this embodiment of the present disclosure, the network control node stores related information of base stations managed by the network control node, and may further store information of APs having an association relationship with these base stations. This information may be stored in a form of an associated data table, as shown in Table 1.

TABLE 1

| Associated record | Base station number | AP number | Status (status) |
|---|---|---|---|
| 1 | 01 05 | 44 45 53 54 00 00 | Y |
| 2 | 01 98 | 44 55 33 54 02 00 | N |
| ... | ... | ... | ... |

As shown in Table 1, a base station number is a cell identity (CI) specified in 3GPP standard TS 23.003 Release 12 and may be a number, having a length of two bytes, defined by a telecommunication operator. An AP number may be a MAC address, having a length of six bytes, of an AP, and the MAC address is globally unique. There is a record in the foregoing table for each pair of associated base stations and AP. If both devices work normally, a state is Y; if a device such as an associated AP fails temporarily, a state is N, representing unavailability of a currently associated AP. The network control node determines a target AP having an association relationship with a target base station using the table, and sends a MAC address of the target AP to the user equipment.

In step S220, after determining the target AP associated with the target base station, the network control node may send the first indication message including the AP information of the target AP to the user equipment. The first indication message is used to instruct the user equipment to perform AP handover. Further, when a target base station has multiple associated APs, the network control node may select, for sending, an AP whose AP state is Y, or may select, according to a busy/idle state of each AP, an AP currently in an idle state, and send the first indication message including the AP information of the target AP to the user equipment, to instruct the user equipment to be handed over to the target AP. In addition, when all states of multiple target APs are Y, the network control node may send a first indication message including AP information of the multiple target APs to the user equipment, and the user equipment may select, according to a situation of the user equipment, one AP in the first indication message to connect. The present disclosure is not limited thereto.

Optionally, in step S220, the network control node may send the first indication message to the user equipment using the target base station, to instruct the user equipment to perform AP handover. Further, the network control node may send the first indication message to the target base station. After the target base station receives the first indication message, the target base station sends the first indication message to the user equipment, to instruct the user equipment to perform AP handover.

Optionally, in step S220, when the user equipment maintains a communication connection to an AP from which the user equipment is handed over, the network control node may send the first indication message to the user equipment using the AP from which the user equipment is handed over. Further, the network control node may determine whether the AP from which the user equipment is handed over maintains the communication connection to the user equipment, and when determining that the user equipment maintains the communication connection to the AP from which the user equipment is handed over, send the first indication message including the AP information using the AP from which the user equipment is handed over. After receiving the first indication message, the AP from which the user equipment is handed over sends the first indication message to the user equipment, to instruct the user equipment to perform AP handover.

Therefore, according to the access point handover method in wireless communications in this embodiment of the present disclosure, after user equipment is handed over to a target base station, according to an association relationship between the target base station and an AP, a network control node instructs the user equipment to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

FIG. 3 illustrates another schematic flowchart of the access point handover method in wireless communications according to this embodiment of the present disclosure. As shown in FIG. 3, the method 200 further includes the following step.

S230: Determine a base station type of the target base station.

Optionally, the sending a first indication message to the user equipment in step S220 of the method 200 further includes the following steps.

S221: When the base station type of the target base station is a micro base station, send the first indication message including the AP information to the user equipment.

In this embodiment of the present disclosure, the base station type may include a micro base station and a macro base station, and may further include a medium base station or another type. The present disclosure is described using an example in which the base station type includes a micro base station and a macro base station. A micro base station is generally deployed at a user-intensive place and managed by a macro base station. A macro base station manages and schedules multiple micro base stations to ensure a maximum overall system capacity in a management scope of the macro base station. A coverage area of the macro base station may generally reach a few kilometers, while a coverage area of the micro base station is generally a few hundreds of meters. The coverage area of the micro base station is very close to a coverage area of an AP. Therefore, in this embodiment of the present disclosure, the network control node sends an AP having an association relationship with a micro base station and an AP having an association relationship with a macro base station to the user equipment for comparison, the AP having an association relationship with the micro base station can more accurately reflect a real physical state of a network and has more practical value.

Further, the base station type may be determined according to a coverage area of a base station. Optionally, the base station type may be determined according to a quantity of users. The present disclosure is not limited thereto. For example, as defined in 3GPP standard TS 36.423 Release 12, according to a coverage area of a base station, base stations may be classified into various types such as a pico cell, a small cell, a medium cell, and a large cell. Among them, the pico cell or the small cell may be included in the micro base station in this embodiment of the present disclosure.

In step S230, to more accurately perform handover to a valid target AP, the network control node may further determine the base station type, and when determining that the base station type of the target base station is a micro base station, send the first indication message including the AP information to the user equipment. Further, after the user equipment is handed over to the target base station, the network control node determines the AP information of the target AP associated with the target base station, and sends the first indication message including the AP information of the target AP to the user equipment. The network control node may determine an associated target AP when the target base station is a macro base station, or may determine an associated target base station when the target base station is a micro base station. However, because a coverage area of a micro base station is very close to a coverage area of an AP, an association relationship between the micro base station and the AP more accurately reflects a real physical state of a network. When determining that the base station type of the target base station is a micro base station, the network control node considers that the target AP associated with the target base station can more accurately reflect a real physical state of a network.

Therefore, according to the access point handover method in wireless communications in this embodiment of the present disclosure, after user equipment is handed over to a target base station, a network control node obtains AP information of a target AP having an association relationship with the target base station, and when the base station is a micro base station, sends a first indication message including the AP information to the user equipment, to instruct the user equipment to perform AP handover according to the AP information. Therefore, unavailability of a currently connected AP caused by handover of user equipment to a target base station can be avoided, the user equipment can be handed over to a valid AP in a more timely and accurate manner, and user experience can be improved.

Figure 4:
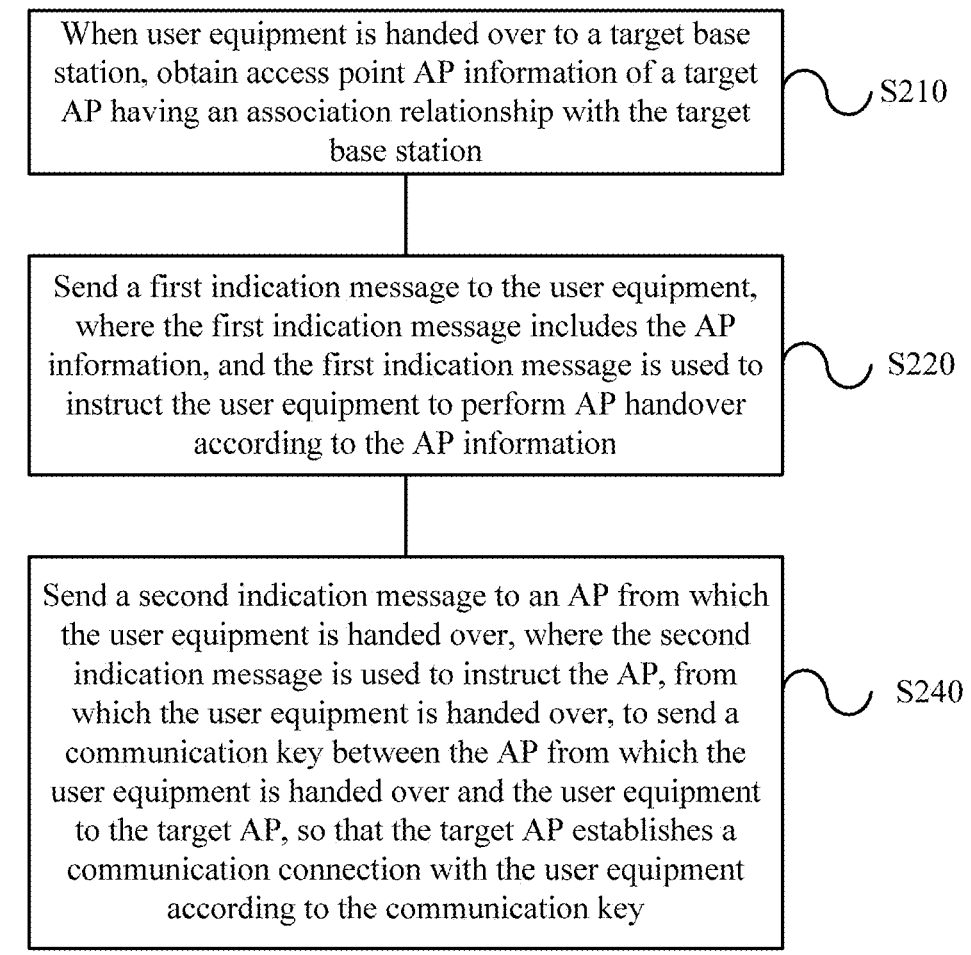
FIG. 4 is still a schematic flowchart of an access point handover method in wireless communications according to an embodiment of the present disclosure.

Optionally, FIG. 4 illustrates still another schematic flowchart of the access point handover method in wireless communications according to this embodiment of the present disclosure. As shown in FIG. 4, the method 200 further includes the following step.

S240: Send a second indication message to an AP from which the user equipment is handed over, where the second indication message is used to instruct the AP, from which the user equipment is handed over, to send a communication key between the AP from which the user equipment is handed over and the user equipment to the target AP such that the target AP establishes a communication connection to the user equipment according to the communication key.

In this embodiment of the present disclosure, after the network control node sends the first indication message including the AP information to the user equipment, the user equipment may establish, according to the AP information, a communication key with the target AP when being handed over to the target AP. Optionally, the network control node may further send the second indication message to the AP that is connected to the user equipment before the handover, to instruct the AP, from which the user equipment is handed over, to send the communication key between the AP from which the user equipment is handed over and the user equipment to the target AP such that the AP more quickly establishes a communication connection to the user equipment according to the communication key.

Further, the second indication message may include the AP information of the target AP. The AP from which the user equipment is handed over determines the target AP according to the AP information and sends the communication key to the target AP.

Therefore, according to the access point handover method in wireless communications in this embodiment of the present disclosure, after user equipment is handed over to a target base station, according to an association relationship between the target base station and an AP, a network control node instructs the user equipment to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

With reference to FIG. 2 to FIG. 4, the foregoing describes in detail the access point handover method in wireless communications according to this embodiment of the present disclosure from a perspective of the network control node. The following will describe, with reference to FIG. 5, an access point handover method in wireless communications according to another embodiment of the present disclosure from a perspective of user equipment.

Figure 5:
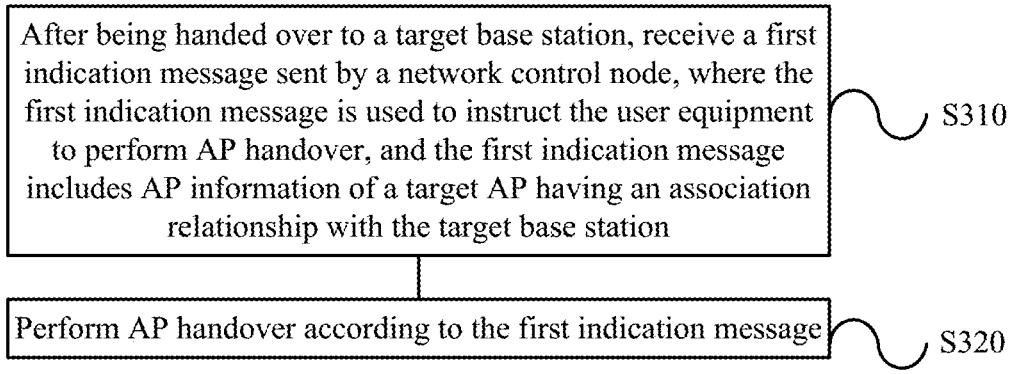
FIG. 5 is a schematic flowchart of an access point handover method in wireless communications according to an embodiment of the present disclosure.

As shown in FIG. 5, FIG. 5 is a schematic flowchart of an access point handover method 300 in wireless communications according to another embodiment of the present disclosure. The method 300 is executed by user equipment. As shown in FIG. 5, the method 300 includes the following steps.

S310: After being handed over to a target base station, receive a first indication message sent by a network control node, where the first indication message is used to instruct the user equipment to perform AP handover, and the first indication message includes AP information of a target AP having an association relationship with the target base station.

S320: Perform AP handover according to the first indication message.

Further, due to location movement or another reason, the user equipment is handed over from an original base station to the target base station. After the user equipment is handed over to the target base station, the network control node may determine the AP information of the target AP having an association relationship with the target base station, and sends the first indication message including the AP information to the user equipment. The user equipment receives the first indication message and performs AP handover according to the AP information in the first indication message.

Therefore, according to the access point handover method in wireless communications in this embodiment of the present disclosure, after user equipment is handed over to a target base station, according to an instruction of a network control node, the user equipment is handed over to an AP having an association relationship with the target base station. Therefore, unavailability of a currently connected AP caused by handover of user equipment to a target base station can be avoided, the user equipment can be handed over to a valid AP associated with the base station in a more timely and accurate manner, and user experience can be improved.

In this embodiment of the present disclosure, due to location movement or another reason, the user equipment is handed over from an original base station to the target base station, and a handover process may follow a signaling process specified by an existing 3GPP standard. After completing the handover to the target base station, the user equipment may send an acknowledgement message to the network control node. The acknowledgement message is used by the network control node to determine that the user equipment has completed the handover. The present disclosure is not limited thereto.

In step S310, after the user equipment is handed over to the target base station, the user equipment receives the first indication message sent by the network control node. The first indication message includes the AP information of the target AP having an association relationship with the target base station and is used to instruct the user equipment to perform AP handover. The AP information may be used to indicate the target AP. Optionally, the AP information may include at least one of a MAC address or identification information of an AP.

Optionally, in step S310, the first indication message may be sent by the network control node when a base station type of the target base station is a micro base station. After the user equipment is handed over to the target base station, the user equipment receives the first indication message, including the AP information, sent to the user equipment by the network control node after obtaining the AP information of the target AP having an association relationship with the target base station and determining that the base station type of the target base station is a micro base station. Because a coverage area of a micro base station is very close to a coverage area of an AP, an association relationship between the micro base station and the AP more accurately reflects a real physical state of a network. Therefore, unavailability of a currently connected AP caused by handover of user equipment to a target base station can be avoided, the user equipment can be handed over to a valid AP in a more timely and accurate manner, and user experience can be improved.

Optionally, in step S310, the user equipment may receive the first indication message sent by the network control node using the target base station. The network control node sends the first indication message including the AP information to the target base station, and the user equipment receives the first indication message sent by the target base station.

Optionally, in step S310, when maintaining a communication connection to an AP from which the user equipment is handed over, the user equipment may receive the first indication message sent by the network control node using the AP from which the user equipment is handed over. The network control node may send, when determining that the AP from which the user equipment is handed over still maintains a communication connection to the user equipment, the first indication message including the AP information to the AP from which the user equipment is handed over, and the user equipment receives the first indication message sent by the AP from which the user equipment is handed over.

In step S320, after receiving the first indication message including the AP information, the user equipment determines the target AP according to the AP information and is handed over to the AP. Optionally, the AP information may include at least one of a MAC address or identification information of the target AP. When the AP information involves multiple target APs, the user equipment may select, according to a current situation of the user equipment, one AP to perform handover. The present disclosure is not limited thereto.

In this embodiment of the present disclosure, the user equipment may be handed over to the target AP according to the AP information, and the user equipment may re-establish a communication key with the target AP to connect to the target AP. Optionally, the AP from which the user equipment is handed over may send a communication key between the AP from which the user equipment is handed over and the user equipment to the target AP such that the user equipment can more quickly establish a communication connection to the target AP using the communication key.

In this embodiment of the present disclosure, the user equipment may establish a communication connection to the target AP while maintaining a communication connection to the AP from which the user equipment is handed over, which implements dual connections, and further implements, using a backup during data transmission, seamless handover from a wireless connection between the AP from which the user equipment is handed over and the user equipment to a wireless connection between the user equipment and the target AP.

It should be understood that interaction between the network control node and the user equipment, related characteristics, functions, and the like described from a perspective of user equipment correspond such that to those described from a perspective of a network control node. For brevity, details are not described herein again.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

Therefore, according to the access point handover method in wireless communications in this embodiment of the present disclosure, after being handed over to a target base station, according to an instruction of a network control node, user equipment may be handed over to an AP having an association relationship with the target base station. Therefore, unavailability of a currently connected AP caused by handover of user equipment to a target base station can be avoided, the user equipment can be handed over to a valid AP associated with the base station in a more timely and accurate manner, and user experience can be improved.

With reference to FIG. 2 to FIG. 5, the foregoing describes in detail the access point handover method in wireless communications according to the embodiments of the present disclosure. The following will describe, with reference to FIG. 6 to FIG. 9, a network control node in a wireless communications network according to an embodiment of the present disclosure and user equipment according to an embodiment of the present disclosure.

Figure 6:
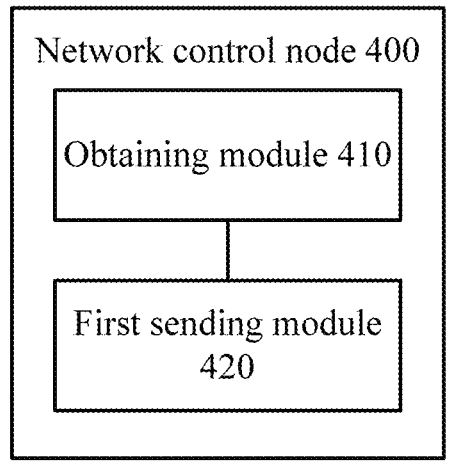
FIG. 6 is a schematic block diagram of a network control node in a wireless communications network according to an embodiment of the present disclosure.

FIG. 6 illustrates a schematic block diagram of a network control node 400 in a wireless communications network according to an embodiment of the present disclosure. As shown in FIG. 6, the network control node 400 includes an obtaining module 410 configured to, when user equipment is handed over to a target base station, obtain access point AP information of a target AP having an association relationship with the target base station; and a first sending module 420 configured to send a first indication message including the AP information obtained by the obtaining module 410 to the user equipment, where the first indication message is used to instruct the user equipment to perform AP handover according to the AP information.

Therefore, according to the network control node in a wireless communications network in this embodiment of the present disclosure, after user equipment is handed over to a target base station, according to an association relationship between the target base station and an AP, the user equipment is instructed to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

In this embodiment of the present disclosure, after the user equipment is handed over to the target base station, the obtaining module 410 of the network control node obtains the AP information of the target AP having an association relationship with the target base station. Optionally, the AP information may include at least one of a MAC address or identification information of an AP. The first sending module 420 of the network control node sends the first indication message including the AP information obtained by the obtaining module 410 to the user equipment, where the first indication message is used to instruct the user equipment to perform AP handover according to the AP information.

Optionally, in this embodiment of the present disclosure, the first sending module 420 may further send, using the target base station, the first indication message including the AP information obtained by the obtaining module 410 to the user equipment.

Optionally, in this embodiment of the present disclosure, when the user equipment maintains a communication connection to an AP from which the user equipment is handed over, the first sending module 420 may send, using the AP from which the user equipment is handed over, the first indication message including the AP information obtained by the obtaining module 410 to the user equipment.

Figure 7:
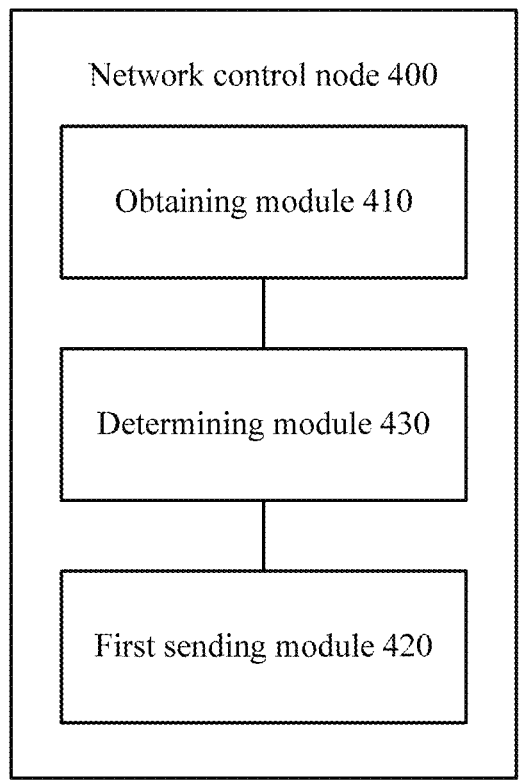
FIG. 7 is a schematic block diagram of a network control node in a wireless communications network according to an embodiment of the present disclosure.

Optionally, FIG. 7 illustrates another schematic block diagram of the network control node in a wireless communications network according to this embodiment of the present disclosure. As shown in FIG. 7, the network control node 400 further includes a determining module 430 configured to determine a base station type of the target base station.

The first sending module 420 is further configured to, when the determining module 430 determines that the base station type of the target base station is a micro base station, send the first indication message including the AP information obtained by the obtaining module 410 to the user equipment.

In this embodiment of the present disclosure, after user equipment is handed over to a target base station, an obtaining module 410 of a network control node obtains AP information of a target AP having an association relationship with the target base station; a determining module 430 determines a base station type of the target base station; when the determining module 430 determines that the base station type of the target base station is a micro base station, a first sending module 420 of the network control node sends a first indication message including the AP information obtained by the obtaining module 410 to the user equipment, where the first indication message is used to instruct the user equipment to perform AP handover according to the AP information. Because a coverage area of a micro base station is very close to a coverage area of an AP, an association relationship between the micro base station and the AP more accurately reflects a real physical state of a network. Therefore, unavailability of a currently connected AP caused by handover of user equipment to a target base station can be avoided, the user equipment can be handed over to a valid AP in a more timely and accurate manner, and user experience can be improved.

Figure 8:
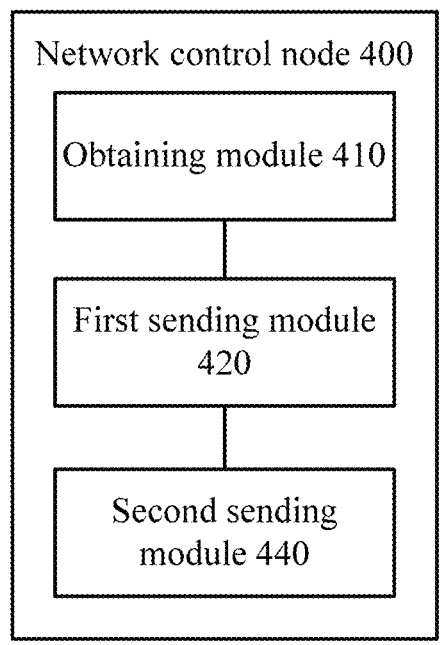
FIG. 8 is still a schematic block diagram of a network control node in a wireless communications network according to an embodiment of the present disclosure.

In this embodiment of the present disclosure, optionally, FIG. 8 illustrates another schematic block diagram of the network control node in a wireless communications network according to this embodiment of the present disclosure. As shown in FIG. 8, the network control node 400 further includes a second sending module 440 configured to send a second indication message to the AP from which the user equipment is handed over, where the second indication message is used to instruct the AP, from which the user equipment is handed over, to send a communication key between the AP from which the user equipment is handed over and the user equipment to the target AP such that the target AP establishes a communication connection to the user equipment according to the communication key.

Further, in this embodiment of the present disclosure, when performing AP handover according to the received first indication message, the user equipment may establish a communication connection to the target AP by re-establishing a communication key. Optionally, the network control node may send the second indication message to the AP, from which the user equipment is handed over, using the second sending module 440. The second indication message is used to instruct the AP, from which the user equipment is handed over, to send a communication key between the AP from which the user equipment is handed over and the user equipment to the target AP such that the target AP more quickly establishes a communication connection to the user equipment according to the communication key.

It should be understood that the network control node 400 according to this embodiment of the present disclosure may correspondingly execute the access point handover method 200 in wireless communications in the foregoing embodiment of the present disclosure, and the foregoing and other operations and/or functions of the modules in the network control node 400 are separately intended to implement the corresponding procedures of the method in FIG. 2 to FIG. 4. For brevity, details are not described herein again.

Therefore, according to the network control node in a wireless communications network in this embodiment of the present disclosure, after user equipment is handed over to a target base station, according to an association relationship between the target base station and an AP, the user equipment is instructed to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

Figure 9:
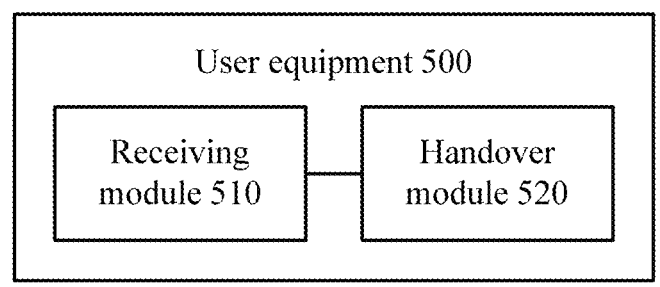
FIG. 9 is a schematic block diagram of user equipment according to an embodiment of the present disclosure.

FIG. 9 illustrates a schematic block diagram of user equipment according to an embodiment of the present disclosure. As shown in FIG. 9, the user equipment 500 includes a receiving module 510 configured to, after the user equipment is handed over to a target base station, receive a first indication message sent by a network control node, where the first indication message is used to instruct the user equipment to perform AP handover, and the first indication message includes AP information of a target AP having an association relationship with the target base station; and a handover module 520 configured to perform AP handover according to the first indication message received by the receiving module 510.

In this embodiment of the present disclosure, after the user equipment is handed over to the target base station, the receiving module 510 receives the first indication message sent by the network control node. The first indication message includes the AP information determined by the network control node according to the target AP associated with the target base station. Optionally, the AP information includes at least one of an MAC address or identification information of the AP, and the first indication message is used to instruct the user equipment to perform AP handover. After the user equipment receives the first indication message, the handover module 520 performs AP handover according to the AP information.

Therefore, according to the user equipment in this embodiment of the present disclosure, after being handed over to a target base station, according to an instruction of a network control node, the user equipment may be handed over to an AP having an association relationship with the target base station. Therefore, unavailability of a currently connected AP caused by handover of user equipment to a target base station can be avoided, the user equipment can be handed over to a valid AP associated with the base station in a more timely and accurate manner, and user experience can be improved.

Optionally, in this embodiment of the present disclosure, after the user equipment is handed over to the target base station, the receiving module 510 is further configured to receive the first indication message sent by the network control node when a base station type of the target base station is a micro base station. The first indication message includes the AP information of the target AP having an association relationship with the target base station and is used to instruct the user equipment to perform AP handover. The user equipment performs AP handover according to the first indication message using the handover module 520.

Optionally, after the user equipment is handed over to the target base station, the receiving module 510 of the user equipment may further receive the first indication message sent by the network control node using the target base station. Further, the network control node sends the first indication message to the target base station, and to the user equipment using the target base station. The receiving module 510 of the user equipment receives the first indication message.

Optionally, when the user equipment maintains a communication connection to an AP from which the user equipment is handed over, the receiving module 510 may further receive the first indication message sent by the network control node using the AP from which the user equipment is handed over. Further, the network control node sends the first indication message including the AP information of the target AP having an association relationship with the target base station to the AP from which the user equipment is handed over; the AP from which the user equipment is handed over sends the first indication message including the AP information to the user equipment; the receiving module 510 of the user equipment performs AP handover according to the AP information after receiving the first indication message.

It should be understood that the user equipment 500 according to this embodiment of the present disclosure may correspondingly execute the access point handover method 300 in wireless communications in the foregoing embodiment of the present disclosure, and the foregoing and other operations and/or functions of the modules of the user equipment 500 are separately intended to implement the corresponding procedures of the method in FIG. 5. For brevity, details are not described herein again.

Therefore, according to the user equipment in this embodiment of the present disclosure, after being handed over to a target base station, according to an instruction of a network control node, the user equipment may be handed over to an AP having an association relationship with the target base station. Therefore, unavailability of a currently connected AP caused by handover of user equipment to a target base station can be avoided, the user equipment can be handed over to a valid AP associated with the base station in a more timely and accurate manner, and user experience can be improved.

Figure 10:
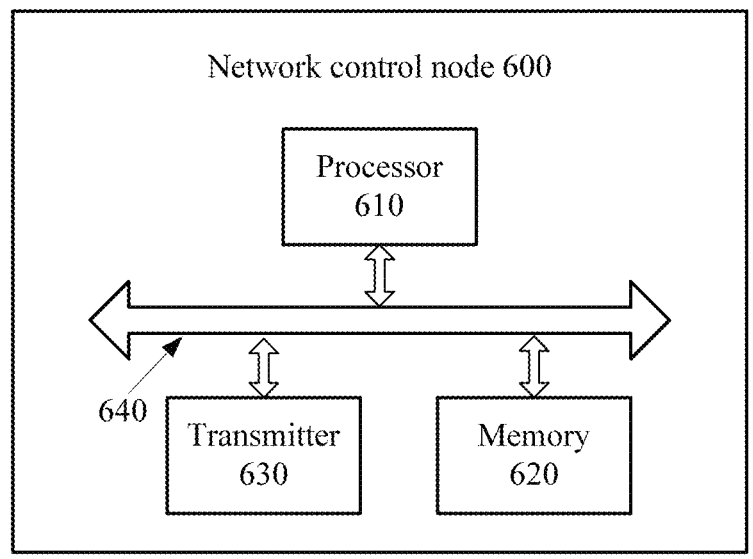
FIG. 10 is a schematic block diagram of a network control node in a wireless communications network according to an embodiment of the present disclosure.

As shown in FIG. 10, an embodiment of the present disclosure further provides a network control node 600 in a wireless communications network. The network control node 600 includes a processor 610, a memory 620, a transmitter 630, and a bus system 640. The processor 610, the memory 620, and the transmitter 630 are connected using the bus system 640. The memory 620 is configured to store instructions, and the processor 610 is configured to execute the instructions stored in the memory 620, so as to control the transmitter 630 to send a signal. The processor 610 is configured to obtain AP information of a target AP having an association relationship with a target base station after determining that user equipment is handed over to the target base station. The transmitter 630 is configured to send a first indication message including the AP information to the user equipment, where the first indication message is used to instruct the user equipment to perform AP handover according to the AP information.

Therefore, according to the network control node in a wireless communications network in this embodiment of the present disclosure, after user equipment is handed over to a target base station, according to an association relationship between the target base station and an AP, the network control node instructs the user equipment to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

It should be understood that, in this embodiment of the present disclosure, the processor 610 may be a central processing unit (CPU), or the processor 610 may be another general purpose processor, a digital signal processor (DSP), an application-specific integrated circuit (ASIC), a field programmable gate array (FPGA) or another programmable logical device, a discrete gate or transistor logical device, a discrete hardware assembly, or the like. The general purpose processor may be a microprocessor, or the processor may be any conventional processor or the like.

The memory 620 may include a read-only memory and a random access memory, and provide an instruction and data for the processor 610. A part of the memory 620 may further include a non-volatile random access memory. For example, the memory 620 may further store device type information.

In addition to a data bus, the bus system 640 may further include a power supply bus, a control bus, a status signal bus, and the like. For clear description, various buses are denoted as the bus system 640 in the figure.

In an implementation process, all steps of the foregoing method may be completed using an integrated logic circuit of hardware in the processor 610 or using an instruction in a software form. The steps of the method disclosed with reference to the foregoing embodiment of the present disclosure may be directly executed and completed by a hardware processor, or may be executed and completed using a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 620, and the processor 610 reads information from the memory 620 and completes the steps of the foregoing method with reference to hardware of the processor 610. To avoid repetition, details are not described herein again.

Optionally, in an embodiment, the processor 610 is further configured to determine a base station type of the target base station, and when determining that the base station type of the target base station is a micro base station, send the first indication message including the AP information to the user equipment.

Optionally, in an embodiment, the transmitter 630 may further send the first indication message including the AP information to the user equipment through the target base station.

Optionally, in an embodiment, the transmitter 630 may send, when the user equipment maintains a communication connection to an AP from which the user equipment is handed over, the first indication message including the AP information to the user equipment using the AP from which the user equipment is handed over.

Optionally, in an embodiment, the transmitter 630 is further configured to send a second indication message to the AP from which the user equipment is handed over, where the second indication message is used to instruct the AP, from which the user equipment is handed over, to send a communication key between the AP from which the user equipment is handed over and the user equipment to the target AP such that the target AP establishes a communication connection to the user equipment according to the communication key.

It should be understood that the network control node 600 according to this embodiment of the present disclosure may correspond to the network control node 400 in the foregoing embodiment of the present disclosure and may correspondingly execute the method in the foregoing embodiment of the present disclosure, and the foregoing and other operations and/or functions of the modules of the network control node 600 are separately intended to implement the corresponding procedures of the method in FIG. 2 to FIG. 4. For brevity, details are not described herein again.

Therefore, according to the network control node in a wireless communications network in this embodiment of the present disclosure, after user equipment is handed over to a target base station, according to an association relationship between the target base station and an AP, the network control node instructs the user equipment to be handed over to an AP associated with the target base station. Therefore, unavailability of a currently connected AP caused by handover of user equipment to a target base station can be avoided, the user equipment can be handed over to a valid AP associated with the base station in a more timely and accurate manner, and user experience can be improved.

Figure 11:
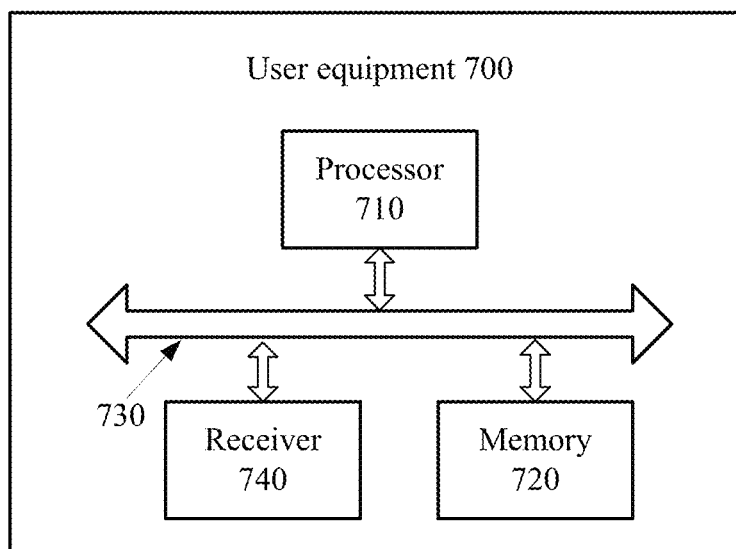
FIG. 11 is another schematic block diagram of user equipment according to an embodiment of the present disclosure.

As shown in FIG. 11, an embodiment of the present disclosure further provides user equipment 700, where the user equipment 700 includes a processor 710, a memory 720, a bus system 730, and a receiver 740. The processor 710, the memory 720, and the receiver 740 are connected using the bus system 730. The memory 720 is configured to store instructions, and the processor 710 is configured to execute the instructions stored in the memory 720, so as to control the receiver 740 to receive a signal. The receiver 740 is configured to, after the user equipment is handed over to a target base station, receive a first indication message that is sent by a network control node and used to instruct the user equipment to perform AP handover, where the first indication message includes AP information of a target AP having an association relationship with the target base station. The processor 710 is configured to perform AP handover according to the first indication message.

Therefore, according to the user equipment in this embodiment of the present disclosure, after being handed over to a target base station, according to an instruction of a network control node, the user equipment may be handed over to an AP having an association relationship with the target base station. Therefore, unavailability of a currently connected AP caused by handover of user equipment to a target base station can be avoided, the user equipment can be handed over to a valid AP associated with the base station in a more timely and accurate manner, and user experience can be improved.

It should be understood that, in this embodiment of the present disclosure, the processor 710 may be a CPU, or the processor 710 may be another general purpose processor, a DSP, an ASIC, an FPGA or another programmable logical device, a discrete gate or transistor logical device, a discrete hardware assembly, or the like. The general purpose processor may be a microprocessor, or the processor may be any conventional processor or the like.

The memory 720 may include a read-only memory and a random access memory, and provide an instruction and data for the processor 710. A part of the memory 720 may further include a non-volatile random access memory. For example, the memory 720 may further store device type information.

In addition to a data bus, the bus system 730 may further include a power supply bus, a control bus, a status signal bus, and the like. For clear description, various buses are denoted as the bus system 730 in the figure.

In an implementation process, all steps of the foregoing method may be completed using an integrated logic circuit of hardware in the processor 710 or using an instruction in a software form. The steps of the method disclosed with reference to the foregoing embodiment of the present disclosure may be directly executed and completed by a hardware processor, or may be executed and completed using a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 720, and the processor 710 reads information from the memory 720 and completes the steps of the foregoing method with reference to hardware of the processor 710. To avoid repetition, details are not described herein again.

Optionally, in an embodiment, the receiver 740 is further configured to receive the first indication message sent by the network control node when a base station type of the target base station is a micro base station. The first indication message includes the AP information of the target AP having an association relationship with the target base station and is used to instruct the user equipment to perform AP handover.

Optionally, in an embodiment, the receiver 740 is further configured to receive the first indication message sent by the network control node using the target base station. Further, the network control node sends the first indication message to the target base station, and the user equipment receives the first indication message sent by the target base station using the receiver 740.

Optionally, in an embodiment, the receiver 740 is further configured to receive the first indication message sent by the network control node using an AP from which the user equipment is handed over. Further, the network control node sends the first indication message including the AP information of the target AP having an association relationship with the target base station to the AP from which the user equipment is handed over; the AP from which the user equipment is handed over sends the first indication message including the AP information to the user equipment; the receiver 740 of the user equipment receives the first indication message sent by the AP from which the user equipment is handed over.

It should be understood that the user equipment 700 according to this embodiment of the present disclosure may correspond to the user equipment 500 in the foregoing embodiment of the present disclosure and may correspondingly execute the method in the foregoing embodiment of the present disclosure, and the foregoing and other operations and/or functions of the modules of the user equipment 700 are separately intended to implement the corresponding procedures of the method in FIG. 5. For brevity, details are not described herein again.

Therefore, according to the user equipment in this embodiment of the present disclosure, after being handed over to a target base station, according to an instruction of a network control node, the user equipment may be handed over to an AP having an association relationship with the target base station. Therefore, unavailability of a currently connected AP caused by handover of user equipment to a target base station can be avoided, the user equipment can be handed over to a valid AP associated with the base station in a more timely and accurate manner, and user experience can be improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or all or a part of the technical solutions may be implemented in the form of a software product. The software product is stored in a storage medium and includes several instructions for instructing a computer device (which may be a personal computer, a server, or a network device) to execute all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An access point handover method in wireless communications, wherein the method comprises:
   obtaining access point (AP) information of a target AP that has an association relationship with a target base station when a user equipment is handed over to the target base station, wherein the association relationship comprises the target AP being integrated with the target base station; and
   sending a first indication message comprising the AP information to the user equipment, and wherein the first indication message instructs the user equipment to perform AP handover according to the AP information.

2. The access point handover method of claim 1, further comprising determining a base station type of the target base station, wherein sending the first indication message comprises sending the first indication message to the user equipment when the target base station is a micro base station.

3. The access point handover method of claim 2, further comprising determining the base station type of the target base station according to a coverage area of the base station.

4. The access point handover method of claim 1, wherein the sending comprises sending the first indication message to the user equipment using the target base station.

5. The access point handover method of claim 1, wherein the sending comprises sending the first indication message to the user equipment using a first AP when the user equipment maintains a communication connection to the first AP, and wherein the first AP is an AP from which the user equipment is handed over.

6. The access point handover method of claim 5, further comprising sending a second indication message to the first AP, wherein the second indication message instructs the first AP to send a communication key that communicatively couples the AP and the user equipment to the target AP so as to enable the target AP to establish a communication connection to the user equipment according to the communication key.

7. An access point handover method in wireless communications, wherein the method comprises:
   receiving, by a user equipment, a first indication message from a network control node after the user equipment is handed over to a target base station; and
   performing, by the user equipment, an access point (AP) handover using the first indication message, wherein the first indication message comprises AP information of a target AP that has an association relationship with the target base station, and wherein the association relationship by the target AP with the target base station comprises the target AP being integrated with the target base station.

8. The access point handover method of claim 7, wherein the receiving comprises receiving the first indication message from the network control node when the target base station is a micro base station.

9. The access point handover method of claim 7, wherein the receiving comprises receiving the first indication message from the network control node using the target base station.

10. The access point handover method of claim 7, wherein the receiving comprises receiving the first indication message from the network control node using a first AP when maintaining a communication connection to the first AP, and wherein the first AP is an AP from which the user equipment is handed over.

11. A network control node for use in a wireless communications network, wherein the network control node comprises:
    a memory comprising instructions; and
    a processor in communication with the memory and configured to execute the instructions that cause the processor to be configured to:
       obtain access point (AP) information of a target AP that has an association relationship with a target base station when a user equipment is handed over to the target base station, wherein the association relationship comprises the target AP being integrated with the target base station; and
       send a first indication message comprising the AP information to the user equipment, and wherein the first indication message instructs the user equipment to perform AP handover according to the AP information.

12. The network control node of claim 11, wherein the instructions further cause the processor to be configured to:
    determine a base station type of the target base station; and
    send the first indication message to the user equipment when the base station type of the target base station is a micro base station.

13. The network control node of claim 12, wherein the instructions further cause the processor to be configured to determine the base station type of the target base station according to a coverage area of the base station.

14. The network control node of claim 11, wherein the instructions further cause the processor to be configured to send the first indication message to the user equipment using the target base station.

15. The network control node of claim 11, wherein the instructions further cause the processor to be configured to send the first indication message to the user equipment using a first AP when the user equipment maintains a communication connection to the first AP, and wherein the first AP is an AP from which the user equipment is handed over.

16. The network control node of claim 15, wherein the instructions further cause the processor to be configured to send a second indication message to the first AP, wherein the second indication message instructs the first AP to send a communication key that communicatively couples the AP and the user equipment to the target AP so as to enable the target AP to establish a communication connection to the user equipment according to the communication key.

17. A computer program product comprising computer-executable instructions for storage on a non-transitory computer-readable medium that, when executed by a processor, cause a computer to:
    obtain access point (AP) information of a target AP that has an association relationship with a target base station when a user equipment is handed over to the target base station, wherein the association relationship comprises the target AP being integrated with the target base station; and
    send a first indication message comprising the AP information to the user equipment, and wherein the first indication message instructs the user equipment to perform AP handover according to the AP information.

18. The computer program product of claim 17, wherein the computer-executable instructions further cause the computer to determine a base station type of the target base station, wherein sending the first indication message comprises sending the first indication message to the user equipment when the target base station is a micro base station.

19. The computer program product of claim 18, wherein the computer-executable instructions further cause the computer to determine the base station type of the target base station according to a coverage area of the base station.

20. The computer program product of claim 17, wherein the computer-executable instructions further cause the computer to claim 1, wherein the sending comprises sending the first indication message to the user equipment using the target base station.

* * * * *